United States Patent
Shreshthi et al.

(10) Patent No.: US 10,944,623 B2
(45) Date of Patent: Mar. 9, 2021

(54) PROGNOSIS AND GRACEFUL DEGRADATION OF WIRELESS AIRCRAFT NETWORKS

(71) Applicant: ROSEMOUNT AEROSPACE INC., Burnsville, MN (US)

(72) Inventors: Mahadevanna Shreshthi, Karnataka (IN); Subhra Kanti Das, Bangalore (IN); Adishesha Chinknyakanhalli Sivaramasastry, Karnataka (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 0 days.

(21) Appl. No.: 16/044,553

(22) Filed: Jul. 25, 2018

(65) Prior Publication Data
US 2019/0363930 A1    Nov. 28, 2019

(30) Foreign Application Priority Data
May 24, 2018   (IN) .............................. 201811019526

(51) Int. Cl.
*H04W 24/04*    (2009.01)
*H04L 12/24*    (2006.01)
(Continued)

(52) U.S. Cl.
CPC .......... *H04L 41/0668* (2013.01); *H04W 4/40* (2018.02); *H04W 24/04* (2013.01);
(Continued)

(58) Field of Classification Search
CPC combination set(s) only.
See application file for complete search history.

(56) References Cited

U.S. PATENT DOCUMENTS 7,822,417 B1   10/2010   Eslambolchi et al.
8,200,242 B2    6/2012   Dietrich et al.
(Continued)

FOREIGN PATENT DOCUMENTS

EP    1791047 A2    5/2007
EP    2642259 A1    9/2013
WO    2005096571 A1   10/2005

OTHER PUBLICATIONS

Extended European Search Report for Application No. 191759737-1204, dated Sep. 13, 2019, 9 pages.

*Primary Examiner* — Fahmida S Chowdhury
(74) *Attorney, Agent, or Firm* — Cantor Colburn LLP

(57) ABSTRACT

Embodiments include a system for prognosis of a wireless aircraft network including a network manager including a network prognostic manager, one or more data controllers operably coupled to the network manager over a first connection, and one or more wireless nodes operably coupled to the one or more data controllers over a second connection, wherein the second connection is a different type of connection than the first connection, wherein the network manager includes a network prognostic manager, wherein the network prognostic manager. The network manager performs a method of receiving measured parameters from a wireless communications network, computing thresholds associated with the parameters, comparing the received parameters to the computed thresholds, identifying a failure condition based on the comparison of the received parameters to the computed thresholds, and based at least in part on the identified failure condition, executing a corrective action.

15 Claims, 14 Drawing Sheets

(51) Int. Cl.
*H04W 4/40* (2018.01)
*H04W 28/02* (2009.01)
*H04W 52/26* (2009.01)

(52) U.S. Cl.
CPC ..... *H04W 28/021* (2013.01); *H04W 28/0221* (2013.01); *H04W 28/0236* (2013.01); *H04W 52/265* (2013.01)

(56) References Cited

U.S. PATENT DOCUMENTS

| | | | |
|---|---|---|---|
| 8,831,524 B2 | 9/2014 | Milner et al. | |
| 9,483,338 B2 | 11/2016 | Bhalla et al. | |
| 10,313,982 B1* | 6/2019 | Rabii | H04W 52/243 |
| 2003/0087636 A1* | 5/2003 | Mazzara | H04W 76/10 |
| | | | 455/426.1 |
| 2010/0040011 A1* | 2/2010 | Kang | H04W 76/28 |
| | | | 370/329 |
| 2010/0172328 A1* | 7/2010 | McGuffin | H04B 7/18506 |
| | | | 370/332 |
| 2012/0287831 A1* | 11/2012 | Cheng | H04W 52/028 |
| | | | 370/311 |
| 2015/0330869 A1 | 11/2015 | Ziarno | |
| 2016/0198415 A1* | 7/2016 | Ohyama | H04W 52/245 |
| | | | 455/522 |
| 2017/0034720 A1 | 2/2017 | Gopalakrishnan et al. | |

\* cited by examiner

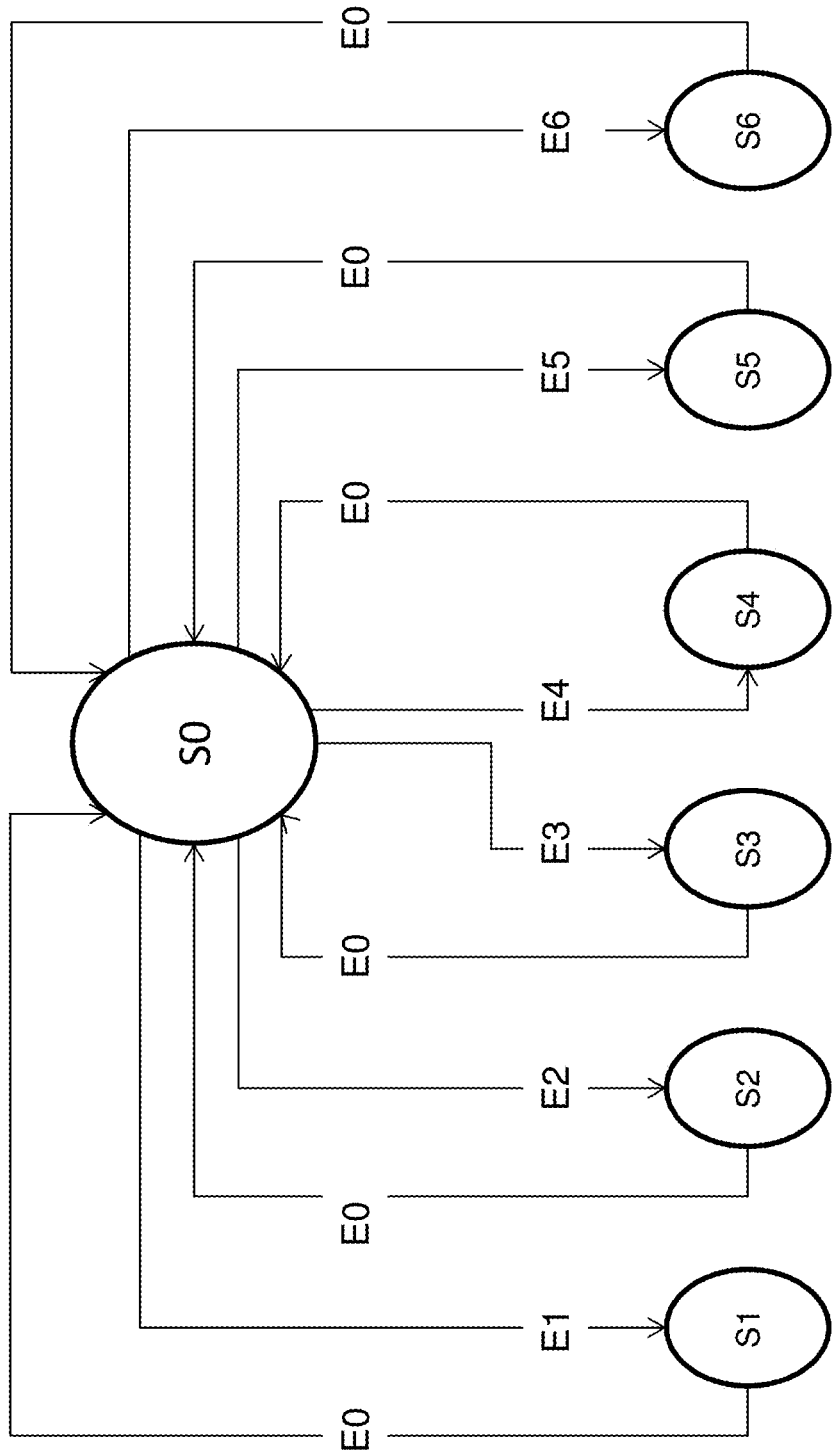

FIG. 8

| Failure Mode | Event and event for state transition | State and State Description | Decision Tree | Action |
|---|---|---|---|---|
| 1. Loss of batter power input 2. Loss of operational hours | E1. Operational hours or battery status of wireless data controller and redundant wireless data controller are below threshold | S1. Battery drain out or low residual life | 900 | Reduce data rate of all wireless nodes |
| 1. Loss of batter power input 2. Loss of operational hours | E2. Operational hours or battery status of wireless data controller is below threshold | S2. Battery drain out or low residual life | 1000 | Switch to redundant wireless data controller |
| 1. Loss of batter power input 2. Loss of operational hours 3. Degradation in signal quality parameters | E3. Signal quality parameters or operational hours or battery status of wireless node is below is threshold and it is a redundant wireless node | S3. (Battery drain out or low residual life or low LQI) AND redundant wireless node | 1100 | Wireless node go to sleep mode |
| 1. Loss of batter power input 2. Loss of operational hours 3. Degradation in signal quality parameters | E4. Signal quality parameters or operational hours or battery status of wireless node is below is threshold and is not redundant wireless node | S4. Battery drain out or low residual life or low LQI AND not redundant wireless node | 1200 | Reduce the data rate of wireless node |
| 1. Degradation in signal quality parameters | E5. Signal quality parameters of wireless node is below is threshold | S5. Low LQI | 1300 | Increase transmit power of wireless node |
| 1. Degradation in signal quality parameters | E6. Signal quality parameters of wireless node is below threshold and event E5 has failed | S6. Wireless node is not able to communicate with wireless data controllers of same cluster | 1400 | Switching wireless node to different wireless cluster |
| 1. No failure mode | E0. Signal quality parameters are above the threshold | S0. Normal operation | | No action |

800

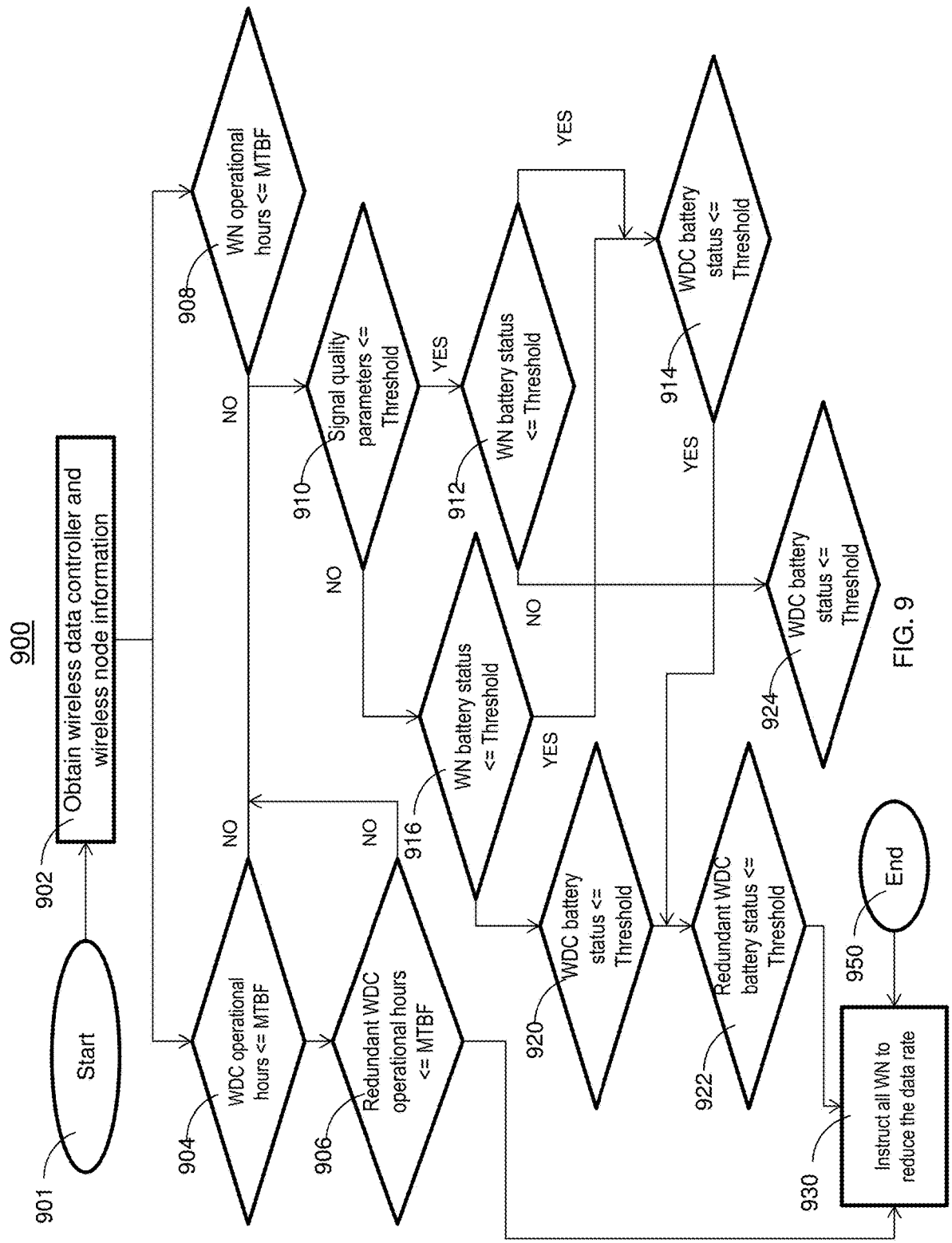

PROGNOSIS AND GRACEFUL DEGRADATION OF WIRELESS AIRCRAFT NETWORKS

CROSS-REFERENCE TO RELATED APPLICATIONS

This application claims the benefit of Indian Application No. 201811019526 filed May 24, 2018, which is incorporated herein by reference in its entirety.

BACKGROUND

The present disclosure relates generally to network management, and more specifically to prognosis and graceful degradation of wireless aircraft networks.

Recent trends in the aviation industry is to move towards a more electric, more intelligent and connected aircrafts. This includes making aircrafts safer and having more availability with minimum downtime. Aircrafts are equipped with monitoring systems to collect different types of data. Data is collected to ensure the safety and reliability of the aircraft systems. The information gathered is used to target improvements to the functioning of the systems and maintenance to reduce the downtime for the aircrafts. These monitoring systems provide the ability to obtain in-flight data as well as data generated during ground/taxi operations.

BRIEF DESCRIPTION

Also disclosed is a system for prognosis and graceful degradation of a wireless aircraft network including a network manager including a network prognostic manager; one or more wireless data controllers operably coupled to the network manager over a first connection; one or more wireless nodes operably coupled to the one or more data controllers over second, wherein the first connection is a different type of connection than the second connection; wherein the network manager includes a network prognostic manager. The network prognostic manager performs a method including receiving measured parameters from wireless nodes; computing thresholds associated with the parameters; comparing the received parameters to the computed thresholds; identifying a failure condition based on the comparison of the received parameters to the computed thresholds; and based at least in part on the identified failure condition, executing a corrective action.

In addition to one or more of the features described above, or as an alternative, further embodiments may include parameters that include at least one of a signal quality parameter, battery status, or operational hours for one or more data controllers and one or more wireless nodes.

In addition to one or more of the features described above, or as an alternative, in further embodiments the signal quality parameter is at least one of a link quality indicator, received signal strength indicator, packet error rate, bit error rate and channel access failure.

In addition to one or more of the features described above, or as an alternative, further embodiments may include thresholds that are associated with the parameters are based on an average for measurements over a period of time under normal operating conditions.

In addition to one or more of the features described above, or as an alternative, in further embodiments the one or more wireless data controllers and the one or more wireless nodes are associated with battery status information and operational hours information.

In addition to one or more of the features described above, or as an alternative, in further embodiments the one or more wireless data controllers and the one or more wireless nodes that communicate over a wireless network are associated with signal quality parameters.

In addition to one or more of the features described above, or as an alternative, in further embodiments the one or more wireless nodes area associated with multiple wireless data controllers including at least a first wireless data controller and a redundant wireless data controller.

In addition to one or more of the features described above, or as an alternative, in further embodiments the one or more wireless data controllers and the one or more wireless nodes are configured in clusters for communication.

In addition to one or more of the features described above, or as an alternative, in further embodiments the one or more wireless nodes are configured to enter a sleep mode based on the identified failure condition.

In addition to one or more of the features described above, or as an alternative, in further embodiments the one or more wireless nodes are configured to communicate at a specified bandwidth.

According to one embodiment, a method for implementing a prognosis of a wireless aircraft network including receiving measured parameters from a wireless nodes; computing thresholds associated with the parameters; comparing the received parameters to the computed thresholds; identifying a failure condition based on the comparison of the received parameters to the computed thresholds; and based at least in part on the identified failure condition, executing a corrective action.

In addition to one or more of the features described above, or as an alternative, further embodiments may include parameters that include at least one of signal quality parameter, battery status, or operational hours for one or more data controllers and one or more wireless nodes.

In addition to one or more of the features described above, or as an alternative, in further embodiments the signal quality parameter is at least one of a link quality indicator, received signal strength indicator, packet error rate, bit error rate and channel access failure.

In addition to one or more of the features described above, or as an alternative, further embodiments may include thresholds that are associated with the parameters are based on an average for measurements over a period of time under normal operating conditions.

In addition to one or more of the features described above, or as an alternative, in further embodiments the identified failure condition includes at least a battery status is below the computed threshold, the corrective action includes reducing a data rate of wireless nodes.

In addition to one or more of the features described above, or as an alternative, in further embodiments the identified failure condition includes at least the signal quality parameter is below the computed threshold, the corrective action includes increasing a transmission power of a wireless node.

In addition to one or more of the features described above, or as an alternative, in further embodiments the identified failure condition includes a battery status and signal quality parameter is below the computing threshold for a redundant wireless node, the corrective action includes switching a wireless node to sleep mode.

In addition to one or more of the features described above, or as an alternative, in further embodiments the identified failure condition includes battery status of wireless data controller is below the computed threshold, the corrective action includes switching a connection to a redundant data controller.

In addition to one or more of the features described above, or as an alternative, in further embodiments the identified failure condition includes inability to communicating with wireless data controller of a single cluster, the corrective action includes switching wireless node to a different cluster of wireless nodes associated with a different wireless data controller.

In addition to one or more of the features described above, or as an alternative, in further embodiments the method is performed by a network prognostic manager of a network manager.

BRIEF DESCRIPTION OF THE DRAWINGS

The following descriptions should not be considered limiting in any way. With reference to the accompanying drawings, like elements are numbered alike:

FIG. 7 depicts a state machine for graceful degradation technique in accordance with one or more embodiments;

FIG. 8 depicts a table describing the states of FIG. 7;

FIG. 9 depicts a flow diagram for instructing all wireless nodes to reduce data rates;

DETAILED DESCRIPTION

In today's environment, various types of sensors are incorporated into existing aircraft networks. The network must be configurable and adaptable. To establish a scalable and adaptive communications between networking entities to developing wireless avionic intra communication infrastructure. Embodiments include ensuring a robust and reliable communication there is a need for continuous monitoring of the network performance. The techniques described herein provide for performing prognostic on the wireless aircraft communication with self-learning and self-recovery.

One or more embodiments include a prognostic module to detect failure conditions for a potential failure mode and corrective actions for seamless degradation of the network. In addition, a self-learning technique using machine learning (neural network) based regression methods of establishing average operational parameters of the given wireless entities is disclosed. In one or more embodiments, a state flow is established to identify different modes of potential failure from observations of signal quality and battery life of networking entities. In addition, automatic reconfiguration of the network to support operation with reduced capability is implemented. The reconfiguration includes operating at a reduced data rate of the wireless nodes, switching wireless nodes to different wireless data controllers, providing a sleep mode in case of redundant node availability, and increasing a transmit power of the wireless node.

Figure 1:
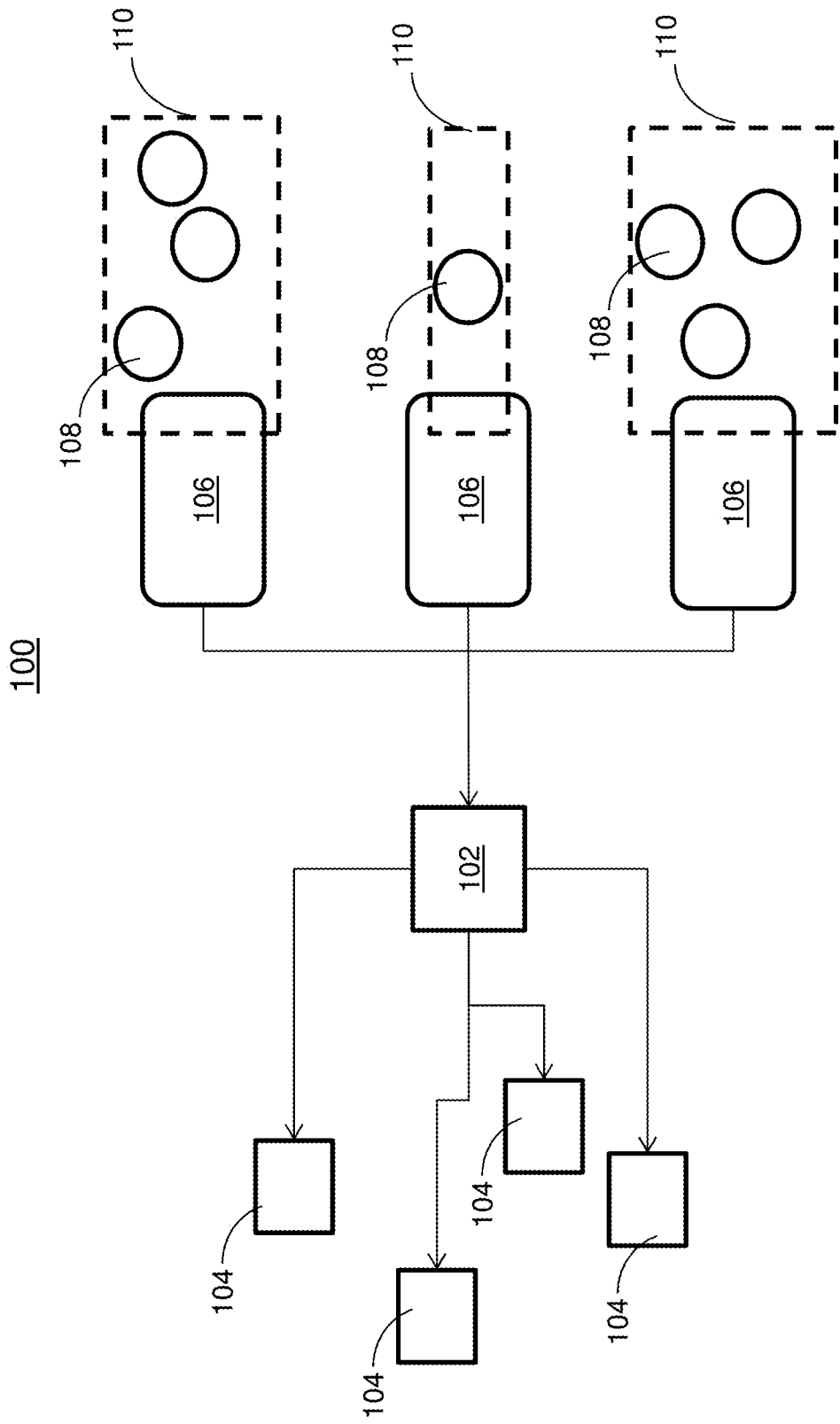
FIG. 1 depicts a wireless avionic environment in accordance with one or more embodiments.

Now referring to FIG. 1, an avionics system 100 having wireless network architecture for implementing the techniques described herein is shown.

The wireless aircraft communications network of system 100 includes a network manager 102, wireless data controller 106 and wireless nodes 108. The network manager 102 is operably coupled to aircraft applications 104 for monitoring the health and status of an aircraft. Embodiments include a bi-directional communication link between the network manager 102 and the aircraft applications. In one or more embodiments, the aircraft applications 104 include integrated vehicle health management (IVHM), flight control, prognostic health management (PHM), engine health management (EHM) to name a few. Additionally, the network manager 102 is configured to communicate with one or more wireless data controllers 106 over a first connection. The wireless data controllers 106 are configured to communicate with one or more wireless nodes 108 over a second connection. In one or more embodiments, the first connection is a wired type connections and the second connection is a wireless connection type having a specified bandwidth. The wireless nodes 108 can be a sensor, an actuator or a similar device and can be cluster and/or associated with respective data controllers 106. In one or more embodiments, the wireless nodes 108 can be configured in clusters 110 with a respective wireless data controller 106 based on signal strength, proximity, data rates, and other techniques.

The wireless data controllers 106 acquire data from the wireless nodes 108 and transmit data to the network manager 102. In turn, the network manger 102 consolidates data received from all the data controllers and transmits the data externally to the aircraft applications 104. In one or more embodiments, the network manager 102 is configured to communicate with the aircraft applications 104 over aircraft interfaces including but not limited to a controller area network (CAN), Ethernet, aeronautical radio incorporated (ARINC), and others. The data controllers 106 are configured to communicate with the network manager 102 over a connection such as an Ethernet connection.

Figure 2:
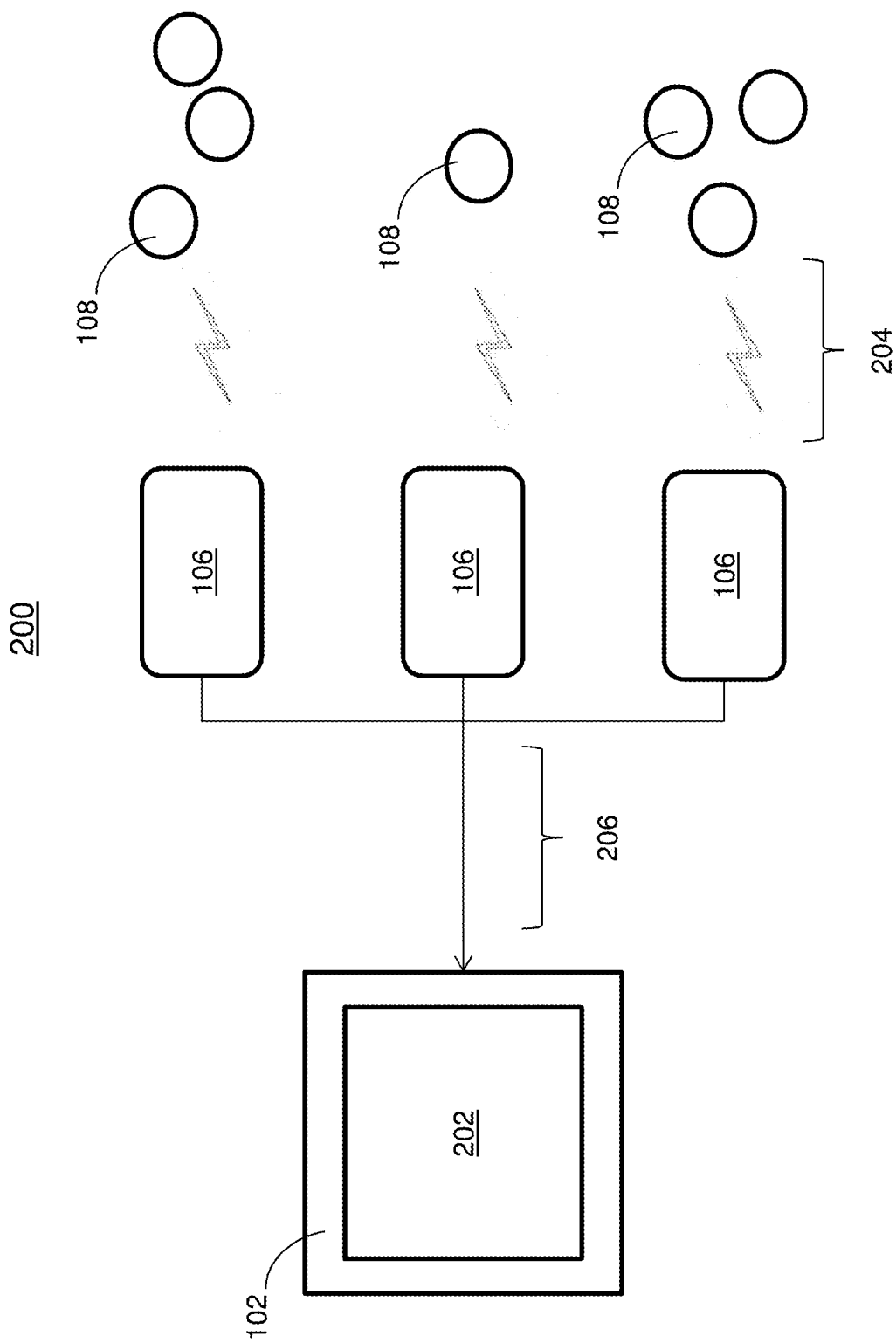
FIG. 2 depicts another wireless avionic environment in accordance with one or more embodiments.

Now referring to FIG. 2, another diagram of the avionics system 200 in is shown. FIG. 2 includes the network manger 102, data controller 106, and wireless nodes 108 shown in FIG. 1. In addition, FIG. 2 depicts the wireless channel 204 between the data controller 106 and the wireless node 108. The data that is exchanged over the wireless channel 204 includes link quality signals, battery status information and operational hours information. The system 200 also includes a communication channel 206 through which the measured values from the data controllers 108 and other data is transferred to the network manager 102. The network manager 102 as shown includes a network prognostic manager (NPM) 202 that uses acquired measured values from the wireless networking entities such as but not limited to signal quality parameters (link quality indicators, received signal strength indicator, bit error rate, channel access failure and packet error rate), batter status of the wireless networking entities and operational hours of the wireless networking entities. In one or more embodiments, the format of a data packet received by the network prognostic manager includes MAC header, payload data, LQI, RSSI, battery information, operational hours, and physical data units (PDU).

The NPM 202 uses measurements of operational parameters as defined above in order to identify failure conditions for the data controllers and nodes. In the event a failure leading event or network breakdown is detected, the NPM 202 provides network self-recovery through re-configuration of the wireless network and implements graceful degradation.

Figure 3:
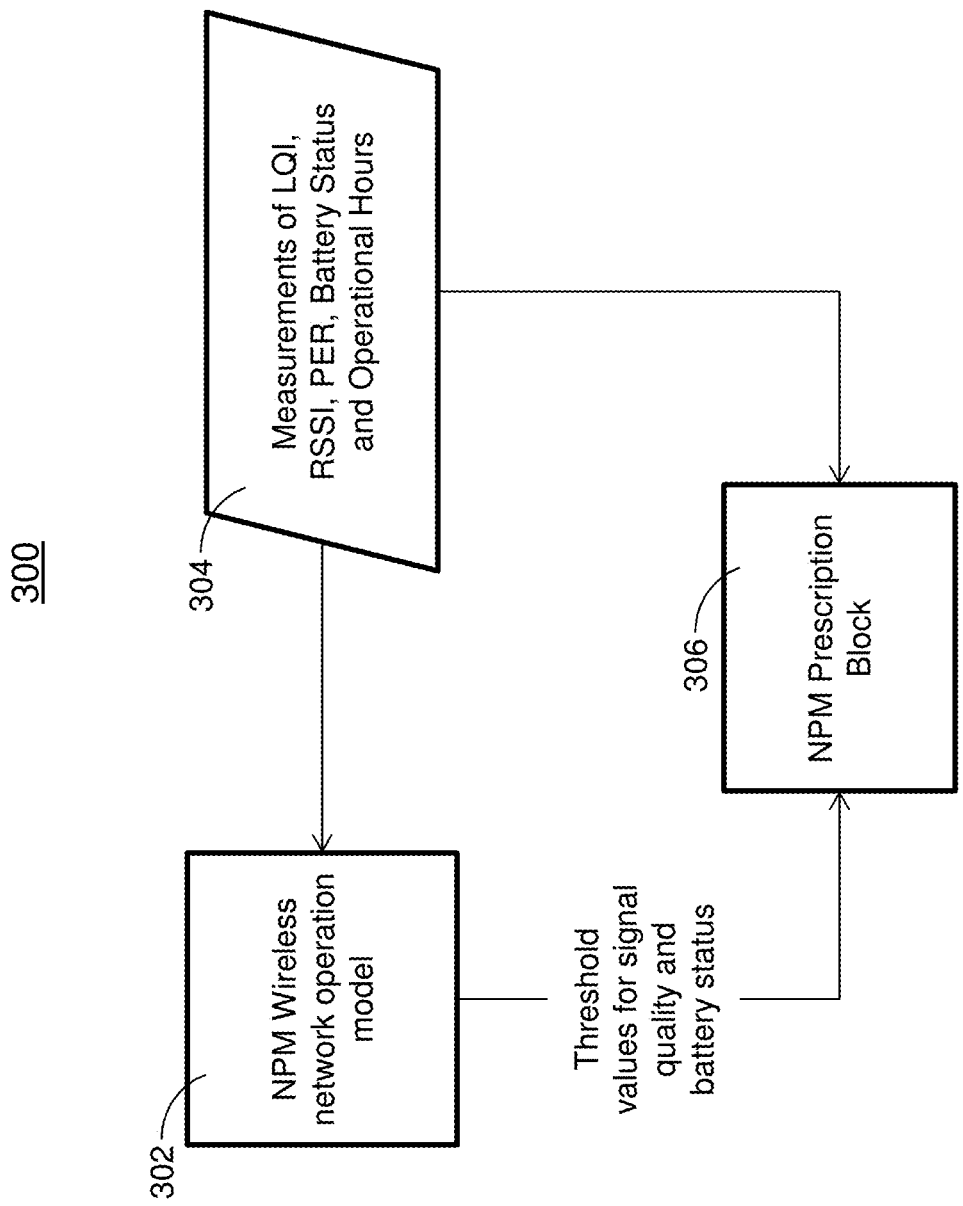
FIG. 3 depicts a diagram for a network prognostic manger.

Referring now to FIG. 3, a diagram for a network prognostic manger (NPM) is shown. In one or more embodiments, the NPM uses a mathematical model to predict the normal operation of the network as threshold values of operational parameters such as signal quality and battery status. During operation of the network threshold values are compared against the measured valued for signal quality and battery status as received from the wireless networking entities. The NPM uses stat flow logic to identify the failure conditions, such as those provided in FIG. 7, in case of any deviations of the network operational parameters from the computed threshold values. The potential failure conditions are identified and used to trigger an execution of a state flow in order to determine one or more network recovery actions corresponding to the failure mode.

In one or more embodiments, the network prognostic manger 300 includes an NPM-wireless network operation model 302 (further described below with reference to FIG. 4) to predict the behavior of the network, such as network 100 shown in FIG. 1, based at least in part on the threshold values for signal quality and battery status parameters measured and received from the data controllers.

Also, the prescription block 306 receives the threshold values from the model 302 and the measured values to perform the graceful degradation of the wireless network.

Figure 4:
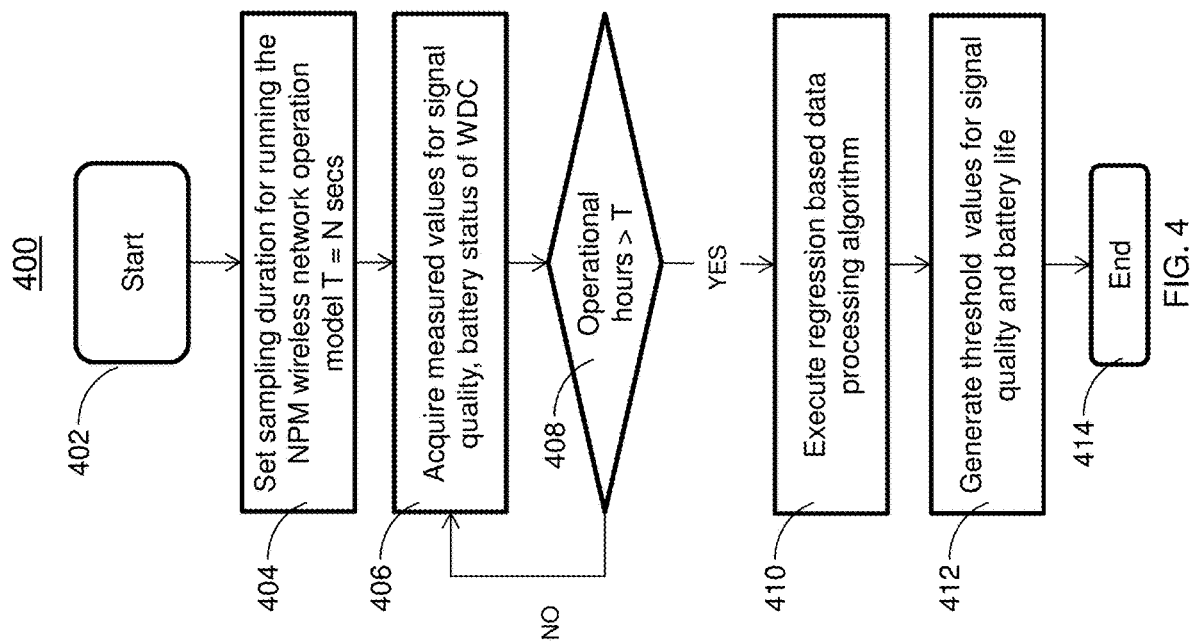
FIG. 4 depicts a flow chart for a wireless network operation model.

Now referring to FIG. 4, a flow chart 400 for a network-wireless network operation model in accordance with one or more embodiments is shown.

The method 400 begins at block 402 where network operation is established and proceeds to block 404, which provides setting a sampling duration for running the NPM wireless network operation model T=N seconds, where N is a positive integer. The method 400 continues to block 406 which provides for acquiring measured value for signal quality, battery status of from the wireless data controller (WDC).

At decision block 408, it is determined whether the current operational hours is greater than the sampling duration T. If so, the method 400 continues to block 410 to execute a regression based data processing algorithm (further described below with reference to FIG. 5). Otherwise, the method 400 returns to block 406 to acquire additional data until the sampling duration has been met. After executing the steps of block 410 the method 400 proceeds to block 412 and generates threshold values for the signal quality and battery life for the WDC and wireless nodes (WN). The method 400 ends at block 414.

Figure 5:
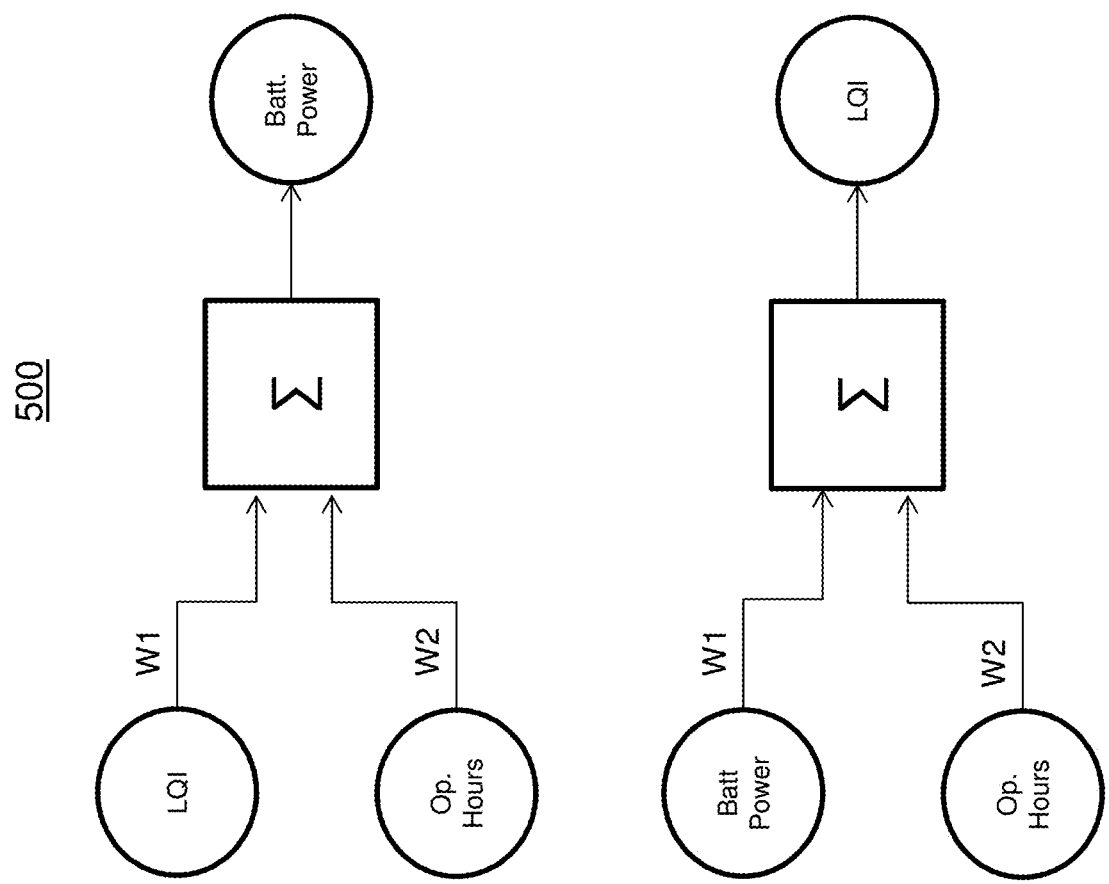
FIG. 5 depicts a regressive model used in the wireless network operation model.

Referring now to FIG. 5, a diagram 500 for a regression based data processing technique is shown. In one or more embodiments, the algorithm is based on a self-learning regression technique. The algorithm arrives at averaged operational parameters through machine learning. The technique uses a training data set. The measure signal quality and battery status received from the data controllers act as the training set for the model shown in FIG. 5.

In one or more embodiments, the measured values of the link quality indicator (LQI), battery power and operation hours are provides as inputs. The regression technique splits the inputs into two training sets in the format {[input vector]; output} as follows: (1) {[LQI, operational hours]; battery power} and (2) {[battery power, operational hours]; LQI}.

In one or more embodiments, the neural network is trained suing measured values of LQI, battery power acquired until the operational hours are within the sampling duration described in FIG. 4. The neural network, through the choice of weights W1 and W2, learns the relationship between the input and output, wherein in a non-limiting example the weight W1 is different than W2. The weights are configurable based on the analysis performed in the regression algorithm. Upon the completion of training, the neural network is used to generate threshold values for the LQI and battery power for the measured values for signal quality and battery health parameters.

Figure 6:
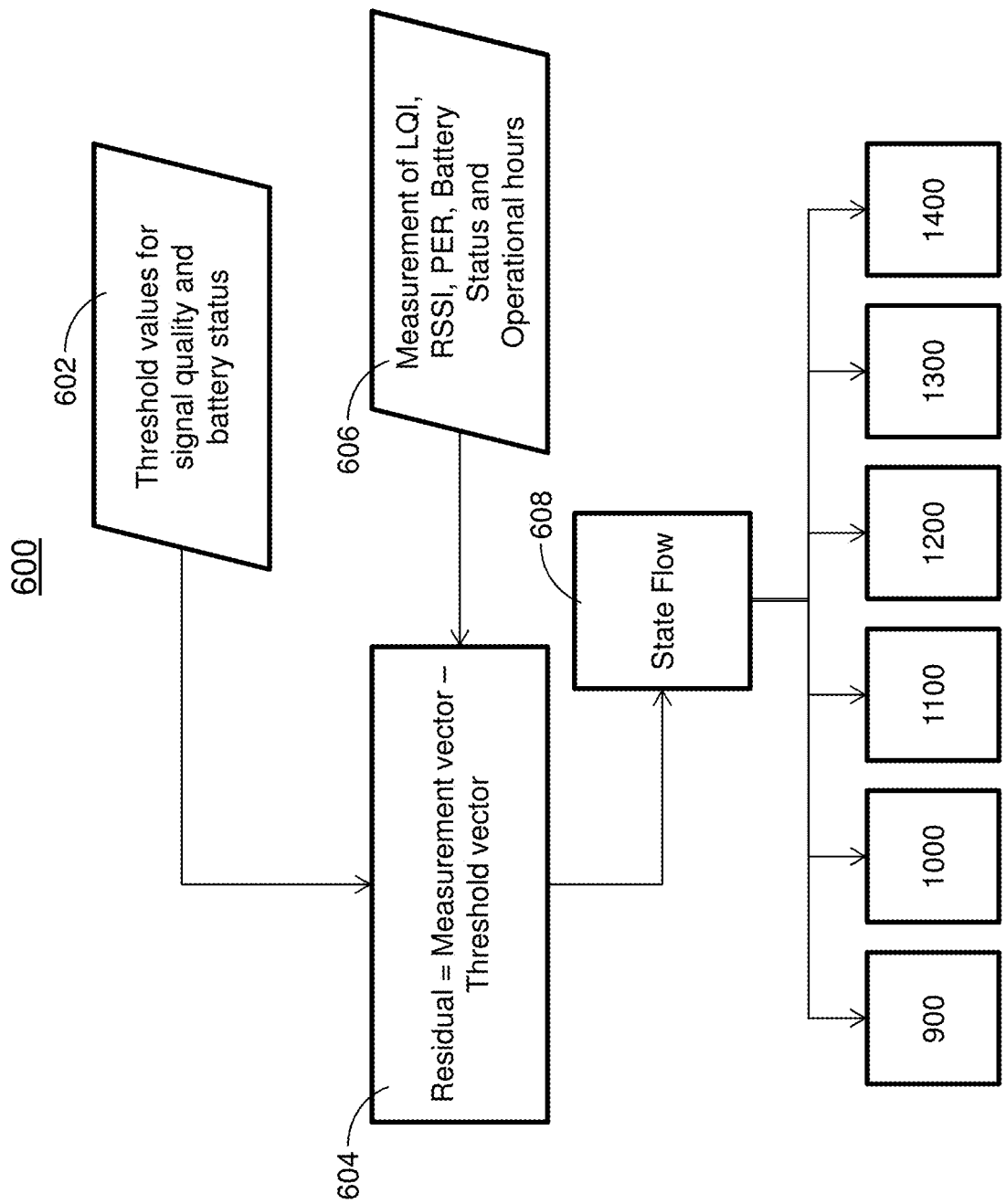
FIG. 6 depicts a flow chart for graceful degradation technique in accordance with one or more embodiments.

Now referring to FIG. 6, a data flow diagram 600 for graceful degradation technique is shown. The threshold values 602 for signal quality and battery status are sent to processing block 604. The threshold values are received from NPM-wireless network operation module. In addition, the measurements of signal quality parameters (LQI, RSSI, PER) battery status and operational hours 606 (measured values) are sent to processing block 604. In one or more embodiments, the measured values of the signal quality and battery health along with operation time are acquired from the network. At processing block 604, a residual value is calculated and used to enter a state of the state flow 608. The residual value, as shown at block 604, is calculated by subtracting the threshold values 602 from the measured values 606. Based on the residual values, a transition from the current state is defined and the state flow 608 enters one of the methods 900-1400. The execution of the methods 900-1400 leads to the corresponding actions that are required to implement a graceful degradation process.

Now referring to FIG. 7, a state flow diagram 700 for implementing a graceful degradation of a network is shown. The state flow diagram 700 includes states (S1-S6 that correspond to states 900-1400 of FIG. 6) and transitions of the states on the occurrence of events (E0-E6). The states are incorporated within the NPM as a set of conditions which define a potential failure mode. The conditions are derived from the computed difference between the measurement vector and the threshold vector. The event is realized as a signal sent to the current state reflecting the conditions for a particular mode of a potential failure. With reference now to FIG. 8, a table 800 is shown to define the states, transitions, and events of FIG. 7.

Now referring to FIG. 9, a method 900 for reducing the data rate for wireless nodes is shown. The method 900 begins at block 901 and continues to block 902 which provides for obtaining wireless data controller (WDC) and wireless node (WN) information.

After obtaining WDC and WN information, the method 900 flows through to branches analyzing the WDC and the WN. In one or more embodiments, the WDC and WN information includes measured data such as battery status, signal strength and operational hours. At block 904, the method 900 provides for comparing the WDC operational hours to the mean-time between failure (MTBF). In one or more embodiments, the MBTF is calculated during normal operations of the WDC. At block 908, the method 900 includes determining whether the WN operational hours is less than or equal to MTBF.

At block 906 it is determined if the redundant WDC operational hours are less than or equal to the MTBF. If it is determined that the redundant WDC's operational hours are less than or equal to the MTBF, the method 900 proceeds to block 930 where the wireless node is instructed to reduce the data rate. Otherwise, the method 900 proceeds to block 910 where it is determined whether the signal quality parameters are less than or equal to a threshold. In one or more embodiments, the signal quality parameters include link quality indicators, RSSI, PER, BER, and channel access failures. If yes, then the method 900 proceeds to block 912 and a determination is made whether a WN battery status is less than or equal to a threshold. In one or more embodiments, the threshold is based on an average of measured data collected under normal operating conditions (without any failure conditions) over a configurable period of time.

If yes, at block 914 it is determined whether the WDC battery status is less than or equal to a threshold. If so, the method 900 proceeds to block where it is determined whether the redundant WDC battery status is less than or equal to a threshold and continues processing.

Referring back to block 910, if the signal quality is determined to be greater than the threshold, the method 900 proceeds to block 916 where it is determined whether the WN battery status is less than or equal to a threshold. If so, the method 900 proceeds to block 914 and continues processing as described above. Otherwise, the method 900, proceeds to block 920 where it is determined whether the WDC battery status is less than or equal to a threshold. If so, the redundant WDC battery status is checked as shown in block 922. If it is determined to be less than or equal to a threshold, the method 900 proceeds to block 930 where the WN is instructed to reduce its data rate. In one or more embodiments, the NPM sends the signal to the WDC to send a signal to all WN to reduce the data rate. The method 900 ends at block 950.

Figure 10:
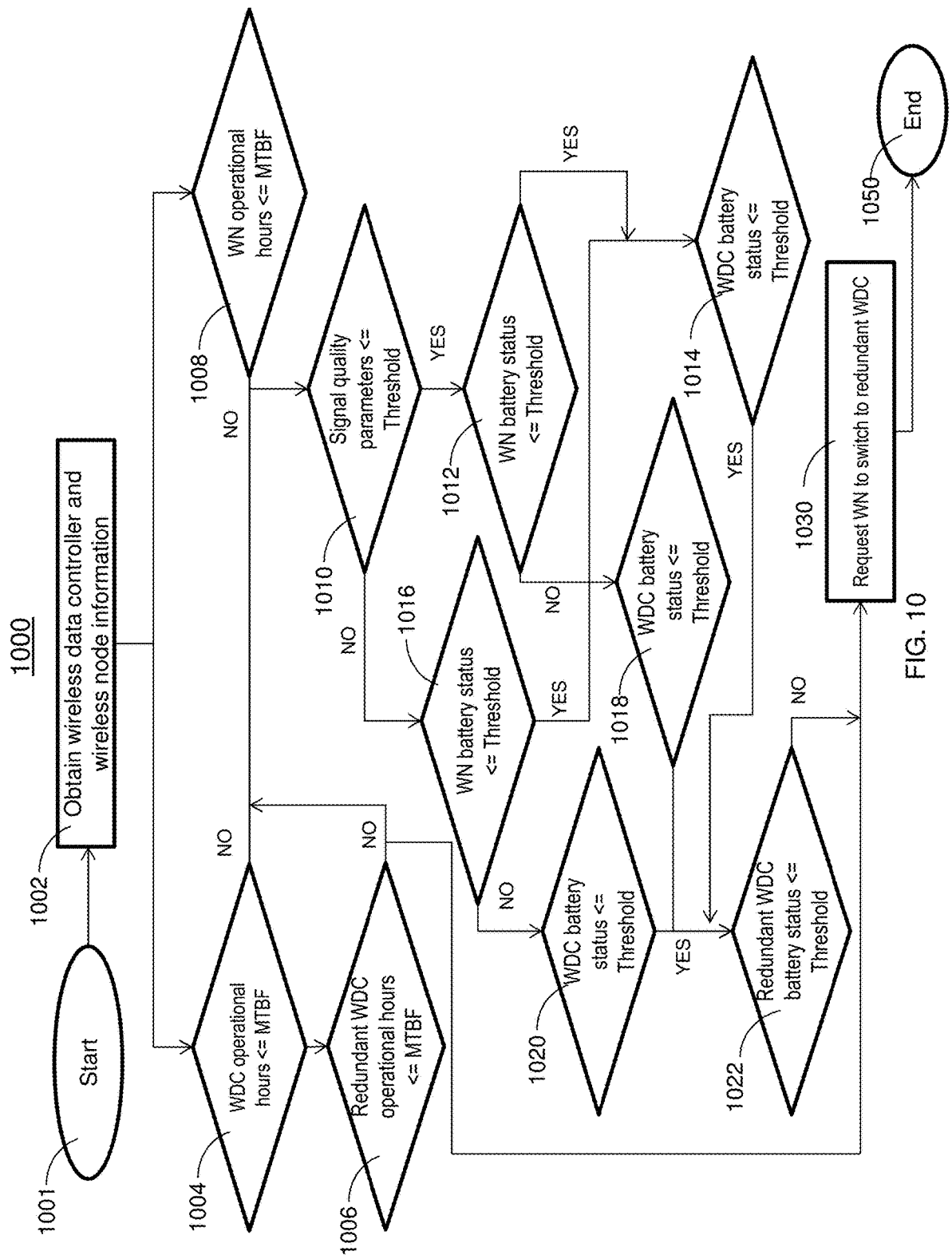
FIG. 10 depicts a flow diagram for instructing wireless nodes to switch to a redundant wireless data controller.

Now referring to FIG. 10, a method 1000 for requesting WN to switch to a redundant WDC is provided. The method 1000 begins at block 1001 and continues to blocks 1002-1012 that include similar steps 902-912 as described in FIG. 9.

With reference to block 1006, if it is determined that the redundant WDC operations hours are less than or equal to MTBF, the method 1000 proceeds to block 1030 to switch the WN to the redundant WDC.

With reference to block 1010 it is determined whether the signal parameters are less than or equal to a threshold, if so, the method 1000 continues to block 1012 it is determined whether the WN battery status is less than or equal to a threshold. If so, the method 1000 proceeds to block 1014 where it is determined whether the WDC battery status is less than or equal to a threshold. If so, the method 1000 proceeds to block 1022 where it is determined whether the redundant WDC battery stats is less than or equal to a threshold. If not, at block 1030 as shown, the method 1000 requests the WN to switch to the redundant WDC.

Referring back to block 1016, if the WN battery status is not less than or equal to the threshold, the method 1000 proceeds to block 1020 where it is determined whether the WDC battery status is less than or equal to the threshold. If so the process continues to block 1022 as described above.

At block 1018, it is determined whether the WDC battery status is less than or equal to a threshold and the method 1000 continues processing towards block 1022 as described above where it is determined whether to send a request the WN to switch to a redundant WDC. The method 1000 ends at block 1050.

Figure 11:
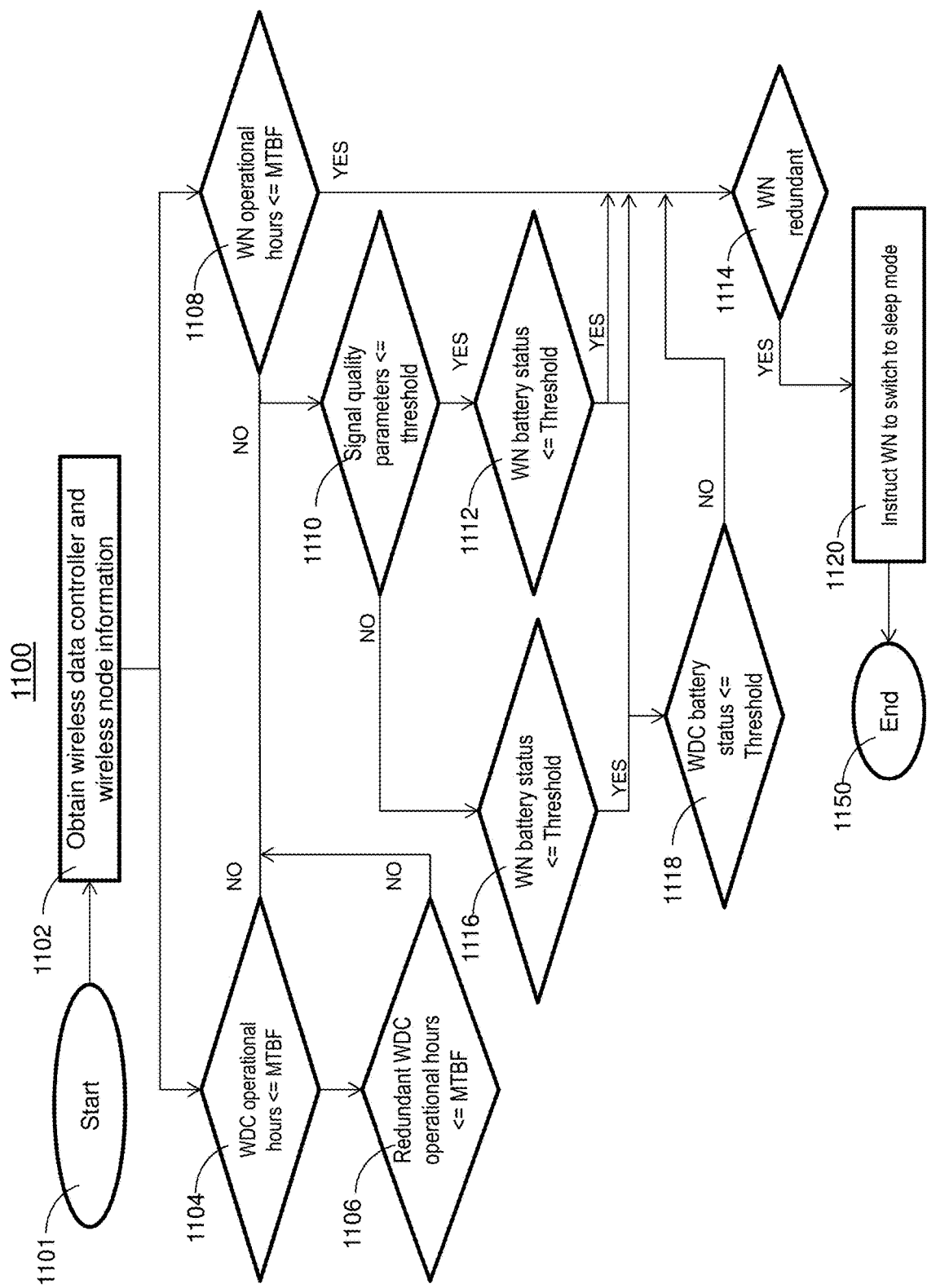
FIG. 11 depicts a flow diagram for instructing wireless nodes to enter a sleep mode.

Now referring to FIG. 11, a method 1100 for switching a WN to sleep mode is provided. The method 1100 begins at block 1101 and continues to blocks 1102-1112 that include similar steps 902-912 as described in FIG. 9.

With reference to block 1114, it is determined whether the node is redundant WN and in the event it is, the WN node is instructed to switch to sleep mode at block 1120. The method 1100 ends at block 1150. Referring back to block 1110, the method 1100 proceeds to block 1116 where it is determined whether the WN battery status is less than or equal to a threshold. Subsequently the method 1100 continues to block 1118 where it is determined whether the WDC battery status is less than or equal to a threshold and continues processing at block 1114 as described above.

Figure 12:
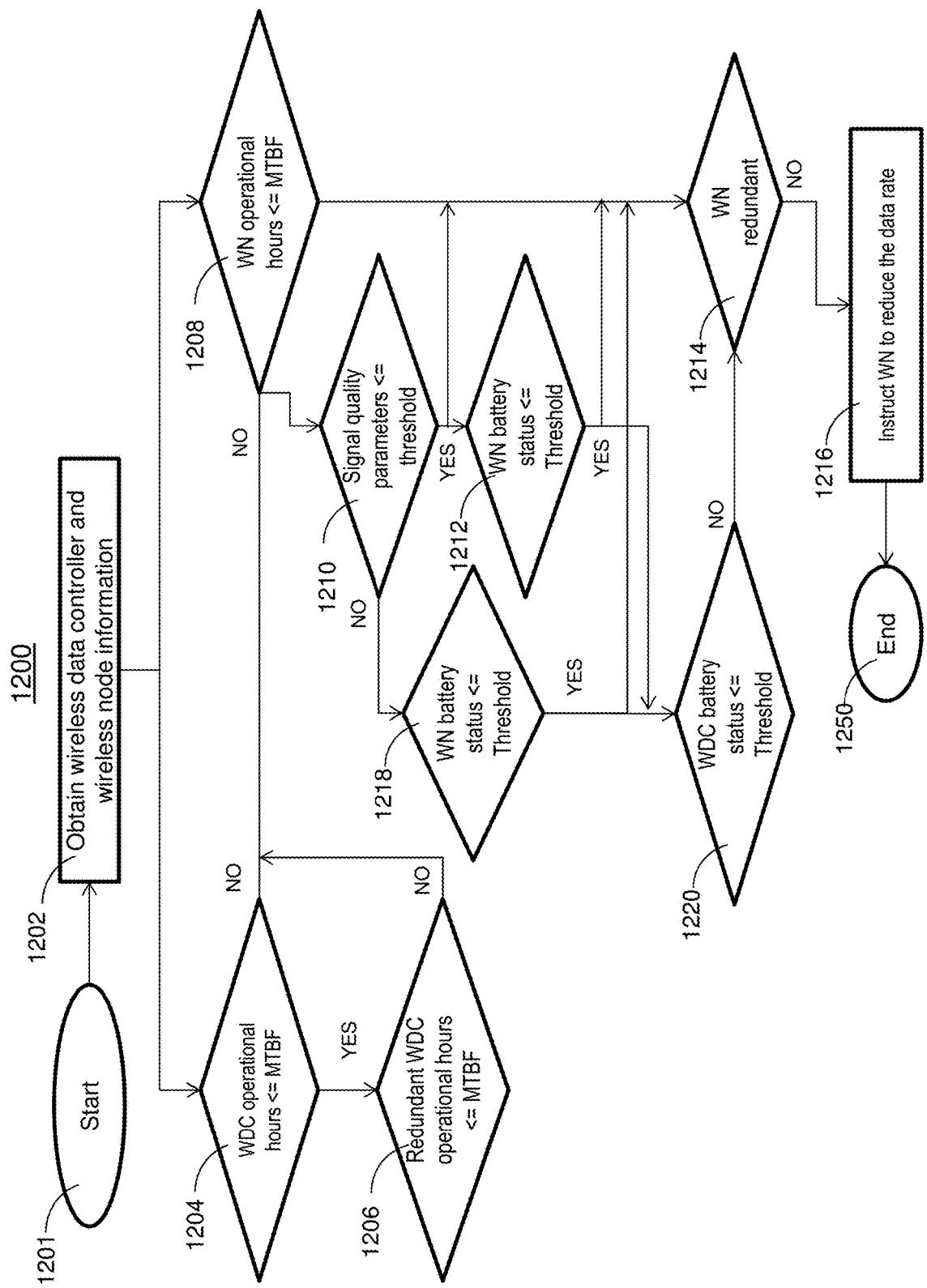
FIG. 12 depicts a flow diagram for instructing wireless nodes to reduce data rates.

Now referring to FIG. 12, a method 1200 provides for requesting WN to reduce the data rate is provided. The method 1200 begins at block 1201 and continues to blocks 1202-1212 that include similar steps 902-912 as described in FIG. 9.

With reference now to block 1212 it is determined whether the WN battery status is less than the threshold and if so, the process continues to blocks 1214 and 1220 where it is determined whether a redundant node/controller exists and check the status of the current WDC battery, respectively. In the event the battery status is below the threshold and no redundant WDC exists, the method 1200 proceeds to block 1216 to reduce the data rate of the WN. The method 1200 ends at block 1250. With reference now to block 1210 it is determined whether the signal parameters are less than or equal to a threshold, the method 1200 proceeds to block 1218 where it is determined whether the WN battery status is less than or equal to a threshold and continues the method 1200 to either block 1220 or 1214.

Figure 13:
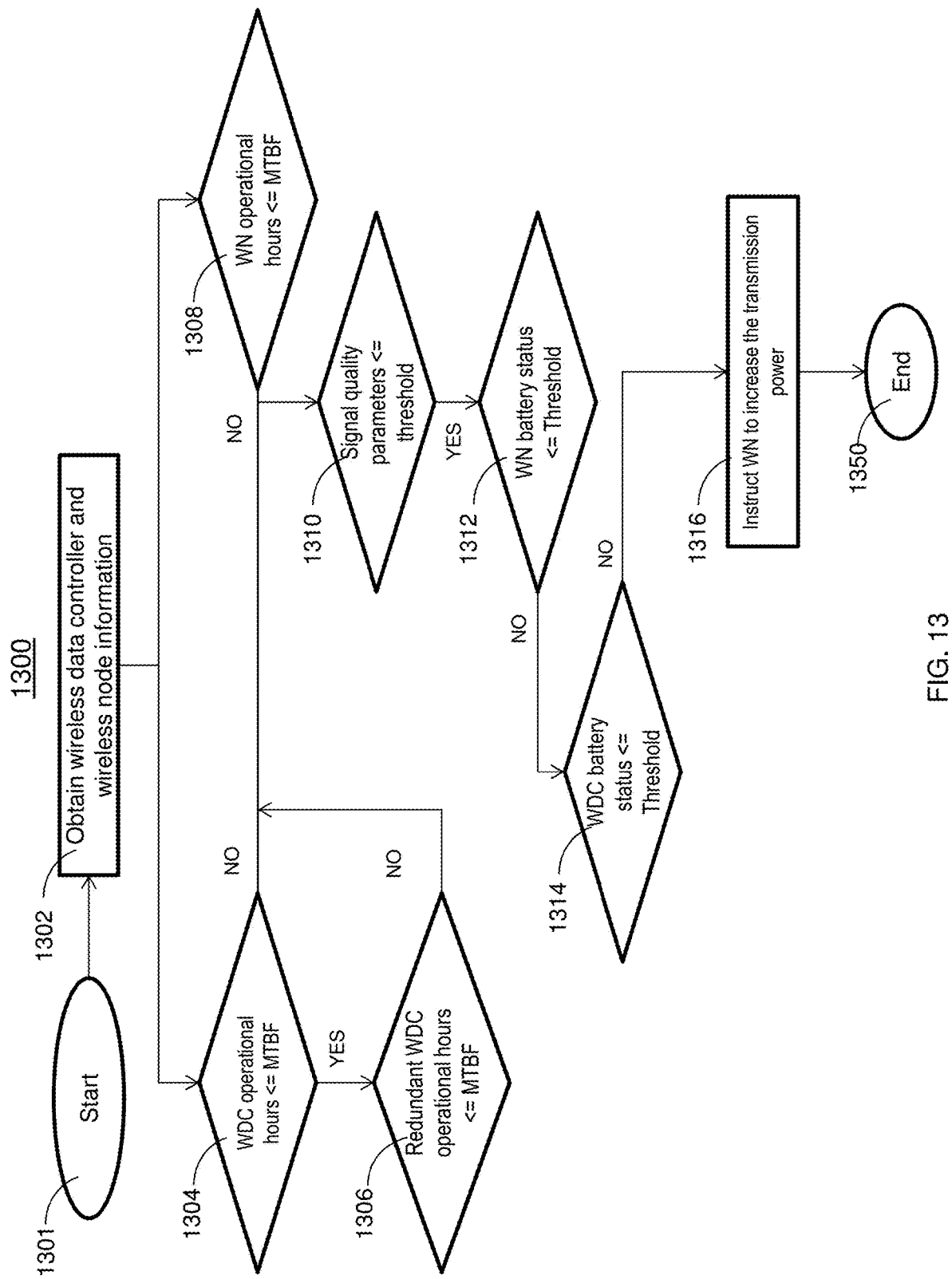
FIG. 13 depicts a flow diagram for instructing wireless nodes to increase transmission power.

Now referring to FIG. 13, a method 1300 for requesting the WN to increase transmission power is provided. The method 1300 begins at block 1301 and continues to blocks 1302-1312 that include similar steps 902-912 as described in FIG. 9.

With reference to block 1312, the method 1300 determines whether the WN battery status is less than or equal to a threshold. If not, the method proceeds to block 1314 where it is determined whether the WDC battery status is less than or equal to a threshold. If not, the method 1300 proceeds to block 1316 which instructs the WN to increase the transmission power. The method 1300 ends at block 1350.

Figure 14:
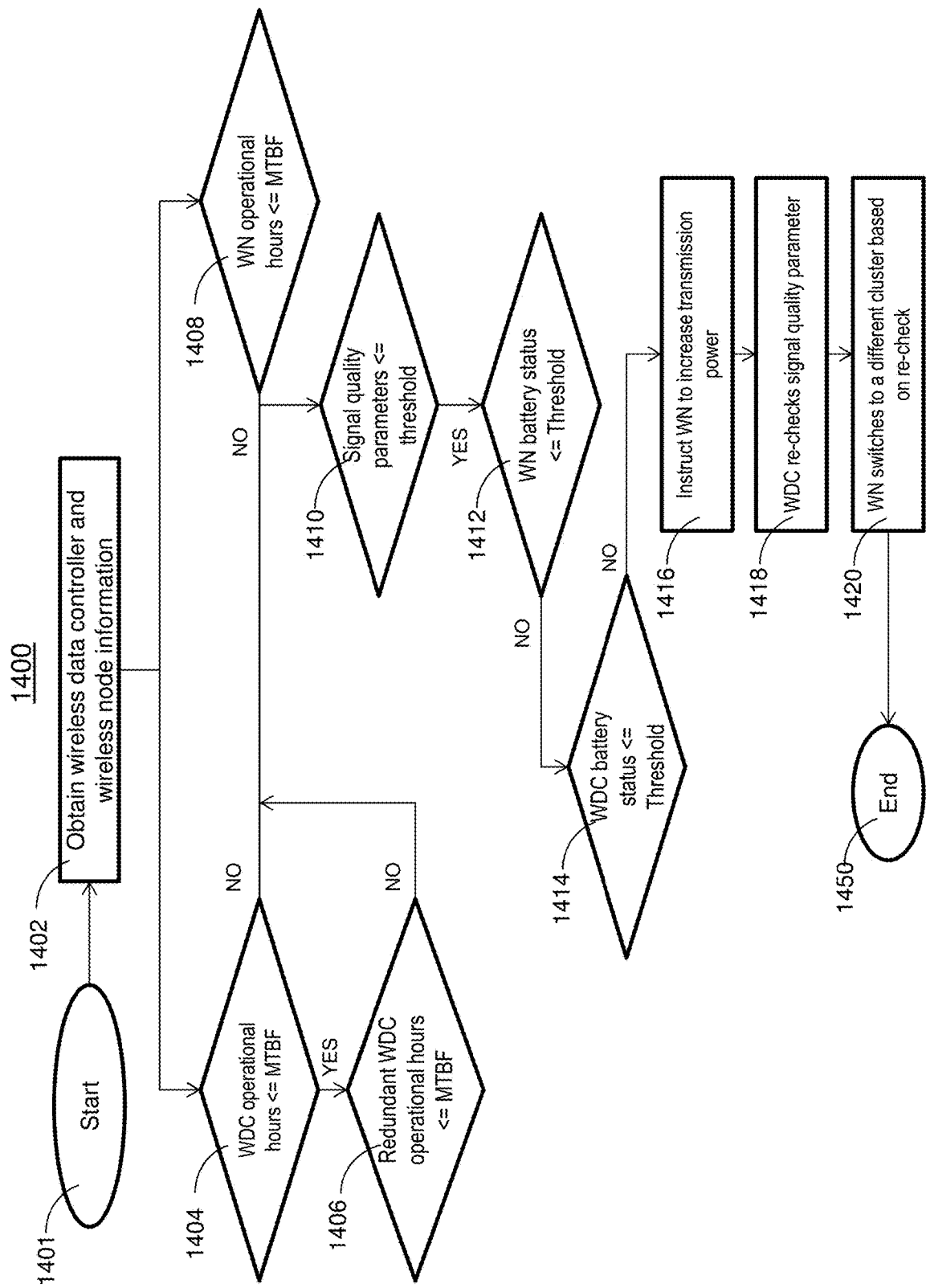
FIG. 14 depicts a flow diagram for instructing wireless nodes to switch to a different cluster.

Now referring to FIG. 14, a method 1400 for requesting WN to switch a different cluster is provided. The method 1400 begins at block 1401 and continues to blocks 1402-1412 that include similar steps 902-912 as described in FIG. 9.

With reference to block 1412, the method 1400 determines whether the WN battery status is less than or equal to a threshold. If not, the method proceeds to block 1414 where it is determined whether the WDC battery status is less than or equal to a threshold. If not, the method 1400 proceeds to block 1416 which instructs the WN to increase the transmission power and at block 1418 the WDC performs a recheck of the signal quality parameter. Responsive to the check, the method 1400 proceeds to block 1420 where the WN is instructed to switch to a different cluster if the WN is unable to communicate wireless data controllers in the current cluster including the redundant wireless data controller. The method 1400 ends at block 1450.

The technical benefits and effects include providing a mechanism to predict a failure mode of the wireless network and ensuring continuous availability of the network. The data collected from the system provides the performance pattern of key parameters. The graceful degradation of network operations avoids any misinterpretation of performance data leading to incorrect decision during aircraft operation. Therefore, providing seamless replacement of wired network with wireless networks in an aircraft environment.

The techniques described herein improvement the efficiency of the wireless network and makes wireless aircraft network reliable and robust. The collected data helps maintenance personnel to easily and efficiently identify the degraded wireless node or wireless data controller thereby reducing network downtime.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for prognosis of a wireless aircraft network comprising:
   a network manager including a network prognostic manager;
   one or more wireless data controllers operably coupled to the network manager over a first connection;
   one or more wireless nodes operably coupled to the one or more wireless data controllers over a second connection, wherein the second connection is a different type of connection than the first connection;
   wherein the network prognostic manager configured to:
      receive measured parameters from the nodes, wherein the parameters include at least one of signal quality parameter, battery status, or operational hours for one or more data controllers and the parameters include at least one of signal quality parameter, battery status, or operational hours for one or more wireless nodes;
      compute thresholds associated with the parameters, wherein the computed thresholds include a battery status threshold;
      compare the received parameters to the computed thresholds, wherein the thresholds associated with the parameters are based on an average for measurements over a period of time under normal operating conditions;
      identify a failure condition based on the comparison of the received parameters to the computed thresholds; and
      execute a corrective action based at least in part on the identified failure condition, wherein the identified failure condition includes determining a battery status and signal quality parameter is below the computing threshold for a current wireless data controller, switching a connection between the one or more wireless nodes and the current wireless data controller to a redundant wireless data controller, if the battery status and signal quality parameter for the redundant data controller is determined to not be below the computing threshold, wherein the redundant wireless data controller is different from the current wireless data controller.

2. The system of claim 1, wherein the parameters include at least one of signal quality parameter, battery status, or operational hours for one or more data controllers and one or more wireless nodes.

3. The system of claim 1, wherein the signal quality parameter is at least one of link quality indicator, received signal strength indicator, packet error rate, bit error rate and channel access failure.

4. The system of claim 2, wherein the one or more wireless data controllers and the one or more wireless nodes are associated with battery status information and operational hours information.

5. The system of claim 2, wherein the one or more wireless data controllers and the one or more wireless nodes that communicate over a wireless network are associated with signal quality parameters.

6. The system of claim 1, wherein the one or more wireless nodes area associated with multiple wireless data controllers including at least a first wireless data controller and a redundant wireless data controller.

7. The system of claim 2, wherein the one or more wireless data controllers and the one or more wireless nodes are configured in clusters for communication.

8. The system of claim 1, wherein the one or more wireless nodes are configured to enter a sleep mode based on the identified failure condition.

9. The system of claim 1, wherein the one or more wireless nodes are configured to communicate at a specified bandwidth.

10. A method implementing a prognostic of a wireless aircraft network comprising;
   receiving measured parameters from nodes over a wireless communications network, wherein the parameters include at least one of signal quality parameter, battery status, or operational hours for one or more data controllers and the parameters include at least one of signal quality parameter, battery status, or operational hours for one or more wireless nodes;
   computing thresholds associated with the parameters, wherein the thresholds associated with the parameters are based on an average for measurements over a period of time under normal operating conditions;

comparing the received parameters to the computed thresholds, wherein the computed thresholds include a battery status threshold;

identifying a failure condition based on the comparison of the received parameters to the computed thresholds; and based at least in part on the identified failure condition, executing a corrective action, wherein the identified failure condition includes determining a battery status and signal quality parameter is below the computing threshold for a current data controller, switching, based on the determination, a connection between the one or more wireless nodes and the current data controller to a redundant data controller, if the battery status and signal quality parameter for the redundant data controller is determined to not be below the computing threshold, wherein the redundant data controller is different from the current data controller.

11. The method of claim 10, wherein the signal quality parameter is at least one of link quality indicator, received signal strength indicator, packet error rate, bit error rate and channel access failure.

12. The method of claim 10, wherein the identified failure condition includes at least a battery status is below the computed threshold, the corrective action includes reducing a data rate of wireless nodes.

13. The method of claim 10, wherein the identified failure condition includes at least the signal quality parameter is below the computed threshold, the corrective action includes increasing a transmission power of a wireless node.

14. The method of claim 10, wherein the identified failure condition includes inability to communicating with wireless data controller of a single cluster, the corrective action includes switching wireless node to a different cluster of wireless nodes associated with a different wireless data controller.

15. The method of claim 10, wherein the method is performed by a network prognostic manager of a network manager.

* * * * *